INVENTORS
NICHOLAS A. BEGOVICH,
HERMAN EPSTEIN
RICHARD H. REED
BY: Henry Hyman
ATTORNEY

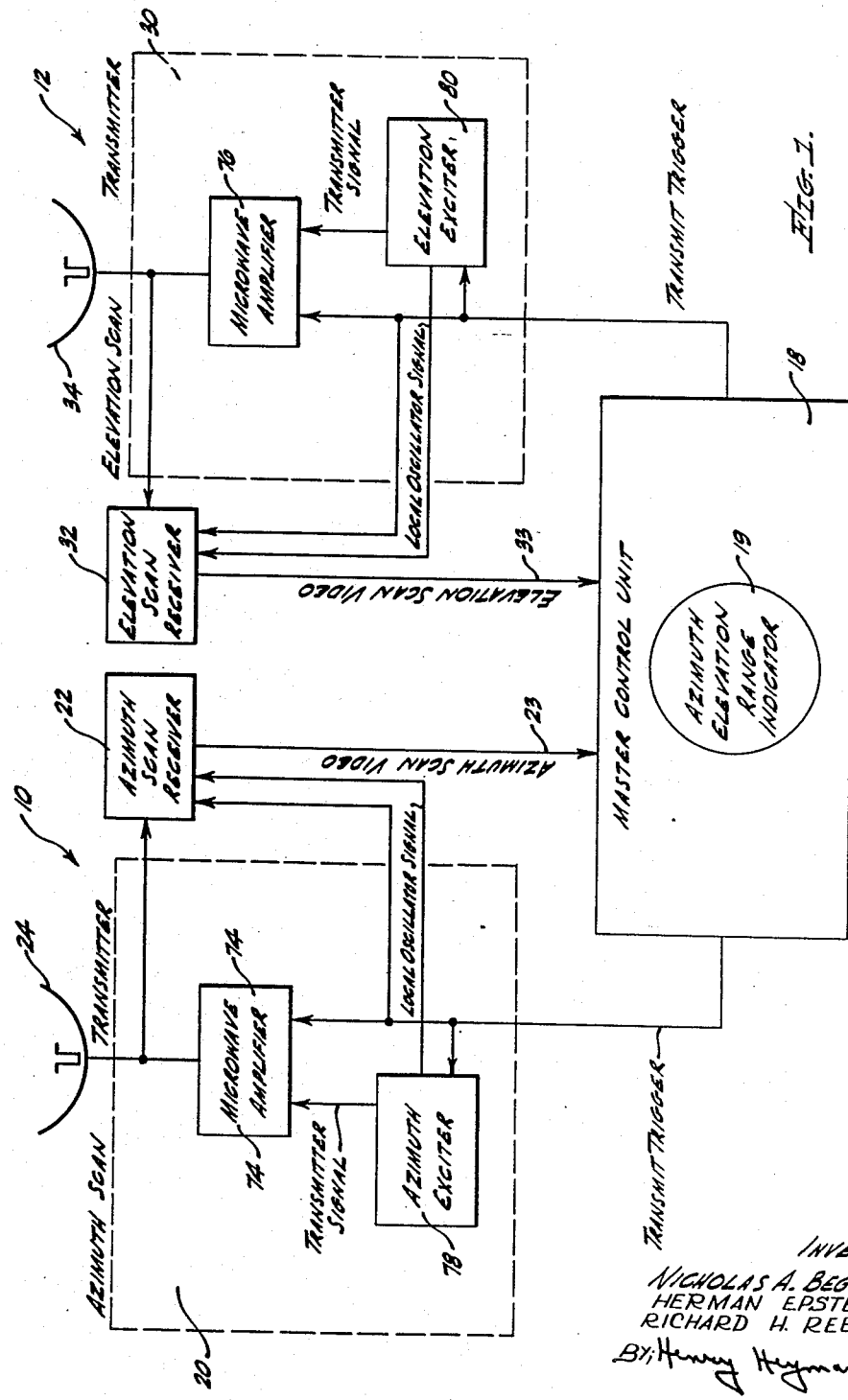

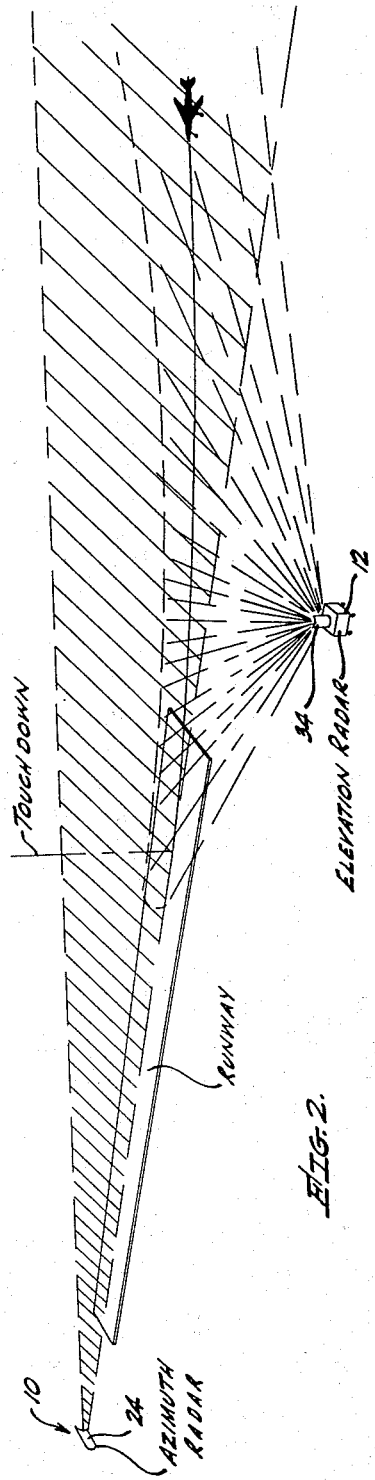
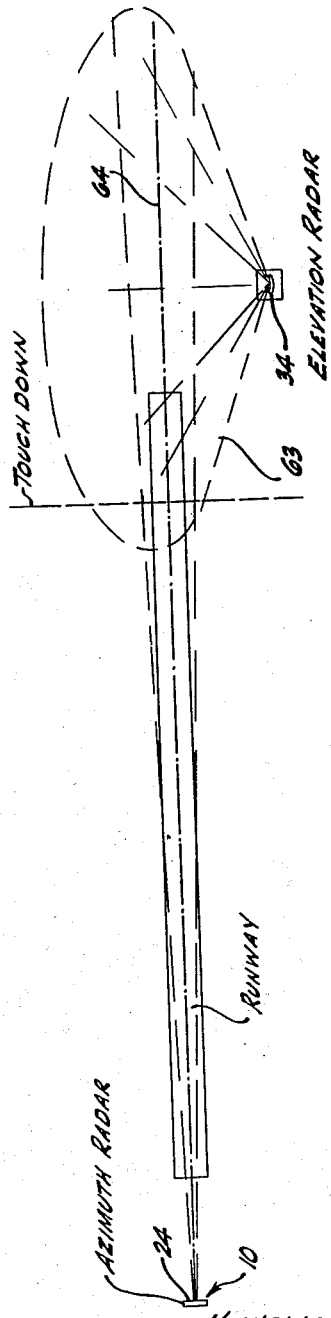

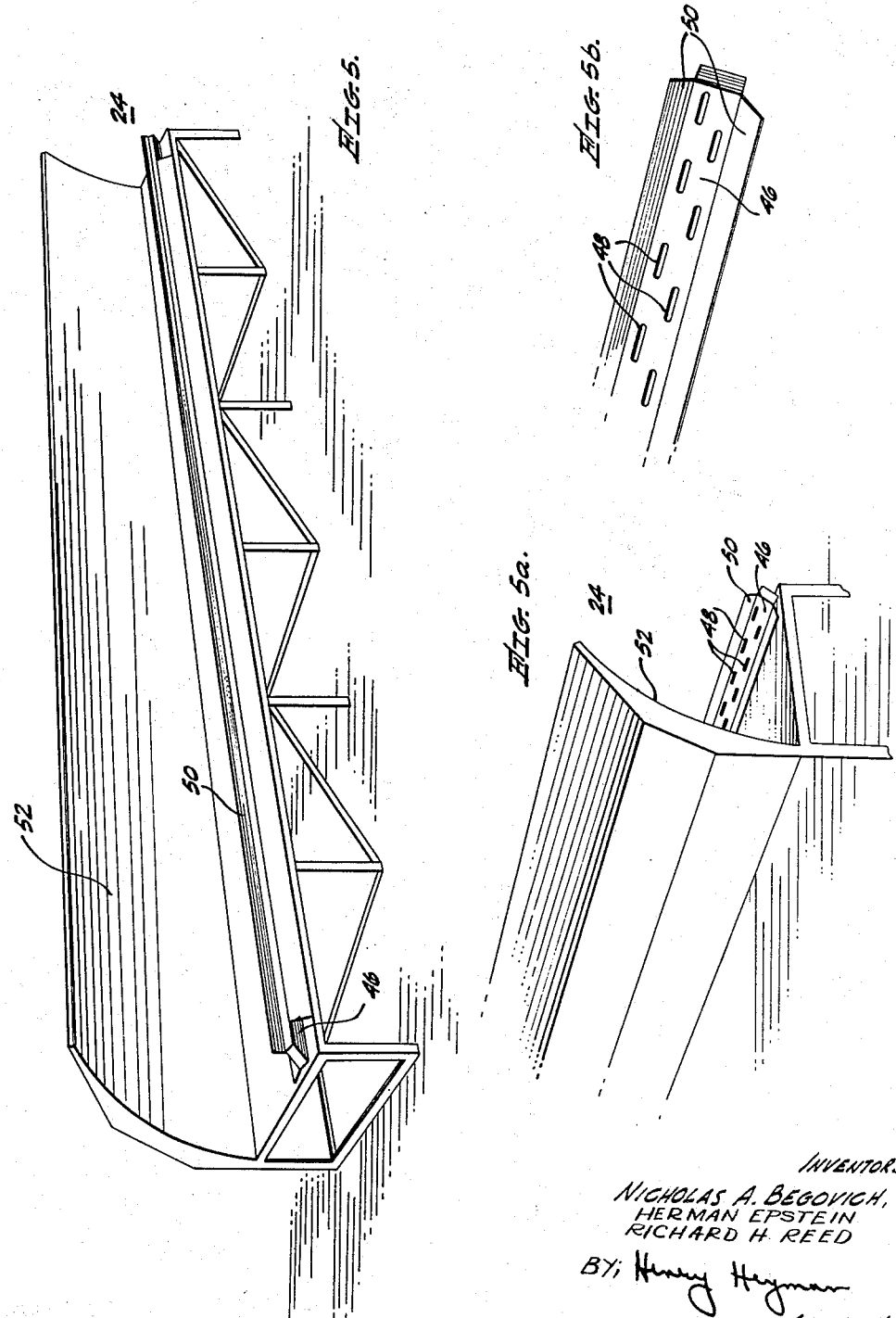

INVENTORS
NICHOLAS A. BEGOVICH,
HERMA EPSTEIN
RICHARD. H. REED
BY; Hinrey Heyman
ATTORNEY.

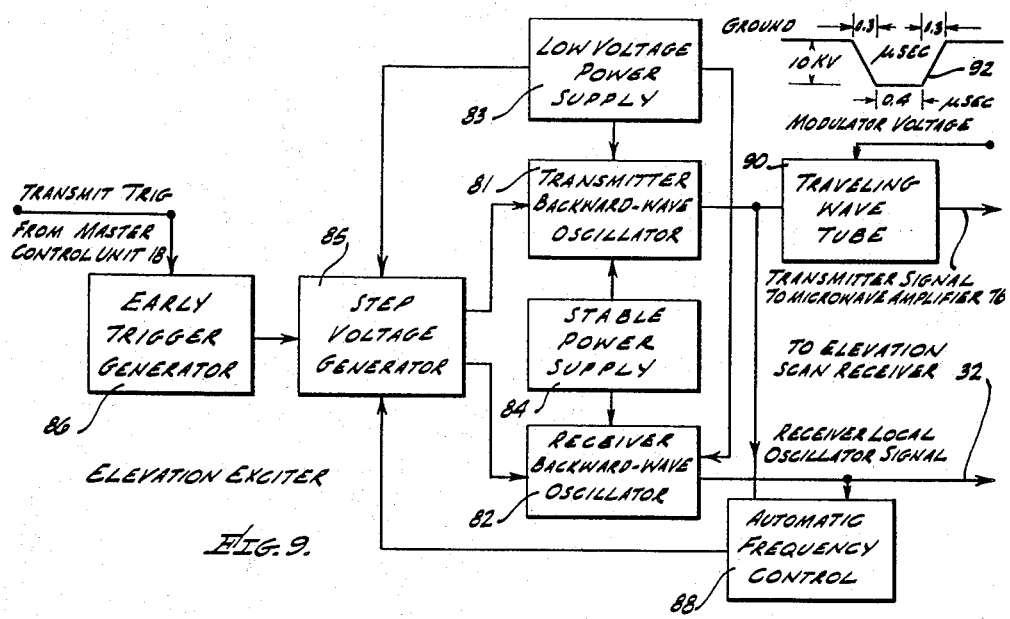
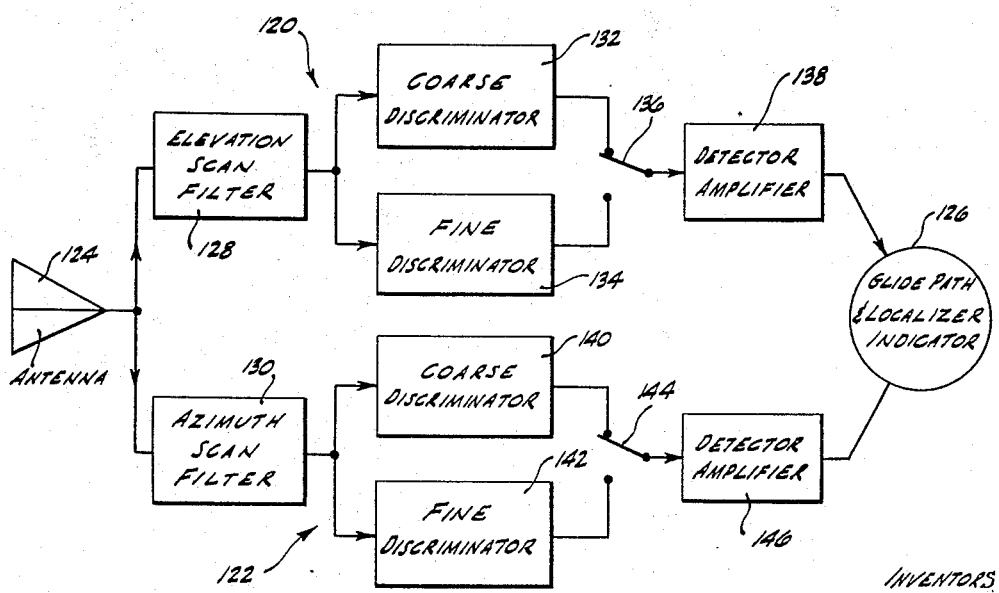

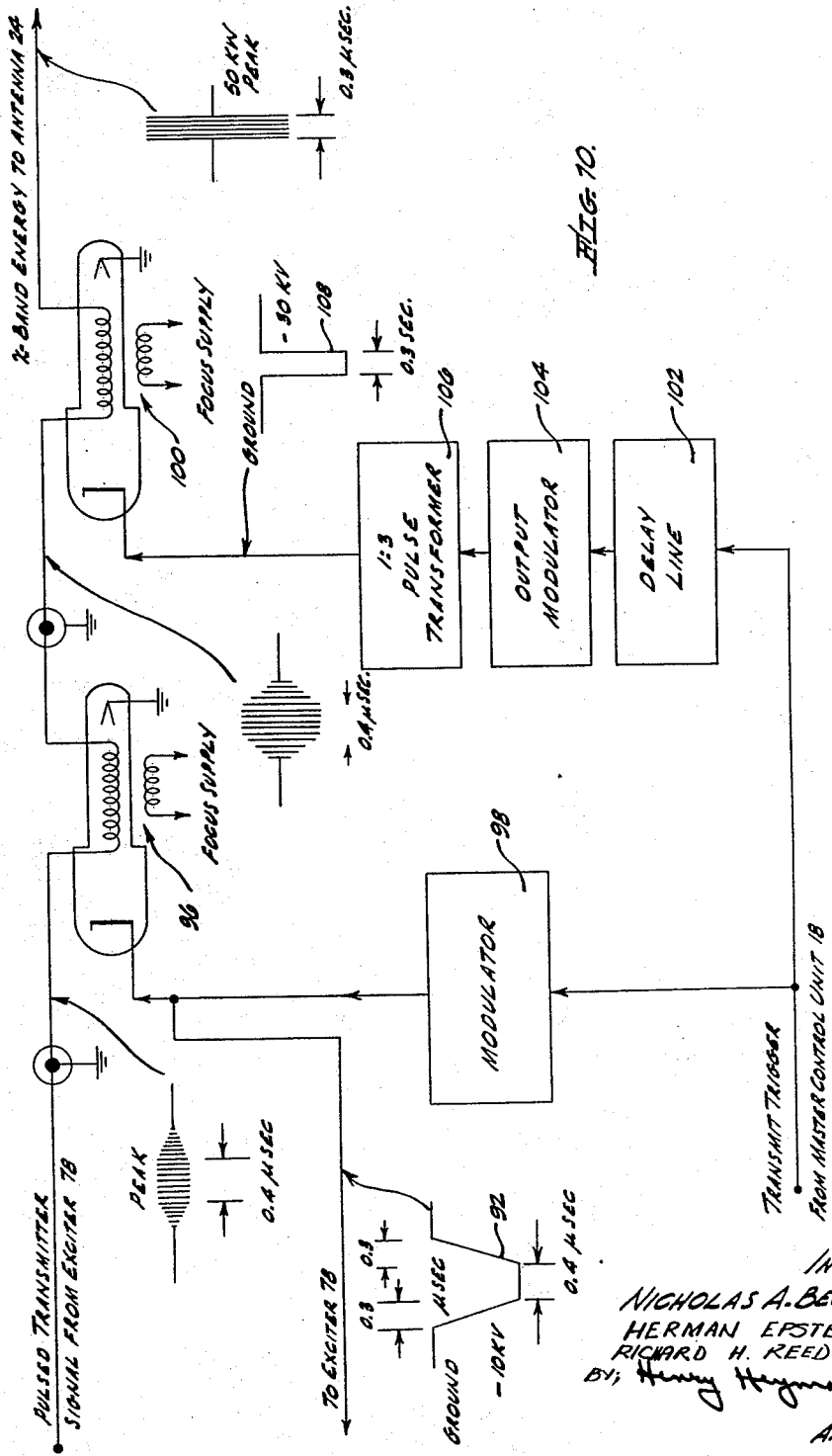

United States Patent Office 2,952,845
Patented Sept. 13, 1960

2,952,845
INSTRUMENT APPROACH AND LANDING SYSTEM FOR AIRCRAFT

Nicholas A. Begovich and Herman Epstein, Los Angeles, and Richard H. Reed, Gardena, Calif., assignors to Hughes Aircraft Company, Culver City, Calif., a corporation of Delaware Filed Sept. 16, 1955, Ser. No. 534,641

8 Claims. (Cl. 343—5)

This invention relates to systems for aiding the approach and landing of an aircraft on an airport runway and more particularly to apparatus capable of radiating electric energy capable of providing the aircraft with information for directing it along a predetermined descent path within the approach volume to the runway.

The inadequacies of existing instrument landing systems (ILS) in regions close to the touchdown area have been such as to confine their use to runway approach rather than to the actual landing of aircraft. These shortcomings have diverted development effort toward different techniques of providing landing position data to the aircraft. In one of these techniques, the so-called ground control approach system (GCA), the aircraft is observed from the ground by means of radar, and directed by radio voice communications to the landing strip. Unfortunately, the errors in the data obtainable from a ground-based radar are again largest when the aircraft is in the final landing phase of its descent, so that precise landing is again unobtainable. The ability of the ground-based radar to accurately define the position of an aircraft is greatly degraded by scintillation or glint of the radar echo. Small changes in the aspect of the aircraft, such as occur in mild cross winds or gusts, cause appreciable uncertainty in a radar determination of the precise position of the aircraft, or of any particular point on the aircraft. This is further aggravated in that the distance from the wheels of an aircraft to the mean position of the center of gravity of its radar reflection varies from one aircraft configuration to another, so that the determination of the altitude of the aircraft's landing wheels above the runway is extremely difficult.

The failure of the present so-called instrument landing systems results largely from their inability to define a smooth, accurate glide path close to the runway touch down area. This difficulty is caused by the distortion of the glide path pattern close to the touchdown area resulting from the method used to form the pattern, and by pattern distortion produced by reflections from the ground and other obstacles. The obvious method of reducing the pattern distortion by radiating a narrower antenna beam is not available in the conventional ILS for two reasons. First, at the frequencies presently used for ILS, sufficient reduction in the beamwidth of the radiated glide path pattern is not achievable without unreasonable antenna height. Moreover, an increase of antenna height would result in the Fresnel zone of the radiation pattern extending tens of miles, thus again resulting in a degradation of the accuracy of the position data obtainable in the aircraft during the final approach and landing phase. Secondly, the use of narrow antenna beams in the present ILS, would make it extremely difficut for an aircraft to acquire the flight path and would result in a complete loss of signal for moderate deviations of the aircraft from the glide path coordinates.

The instrument approach and landing system of the present invention solves all of the aforementioned problems. More particularly, the first problem is solved by the use of higher operating frequencies thereby reducing both the antenna size and the extent of the Fresnel zone of the antenna radiation pattern to within tolerable limits. The second problem is solved by radiating a multiplicity of narrow beams, each of a different frequency from two different locations in the vicinity of the runway to produce a unique correspondence between frequency and angular coordinates within the approach volume of the runway. In accordance with the present invention, a first series of vertical beams is radiated from one location and a second series of flat beams is radiated from a second location to provide information for the determination of the azimuth and elevation, respectively, of the aircraft. Thus, by the relatively simple measurement in the aircraft of the frequency of the electromagnetic energy striking the aircraft, its angular position with respect to the runway can be uniquely and accurately determined. The multiplicity of narrow antenna beams results in an overall angular volume coverage equal to that of the present low frequency ILS and in addition eliminates the glide path distortions resulting from the use of broad antenna beams.

The introduction of frequency as a unique measure of angular position with respect to the runway enables the use of extremely simple position measuring equipment in the aircraft. That is, an aircraft may determine its angular coordinates with respect to the runway by measuring the frequencies of the azimuth and elevation beams which are incident on the aircraft. In addition, a suitable glide path may be provided by the off-center intersection of the vertical azimuth beam with a flat conically shaped elevation beam that is tilted towards the takeoff direction of the runway. In this case, frequency discriminators adapted to generate null outputs for frequencies corresponding to the desired glide path may be located in the aircraft to provide the pilot with information for directing the aircraft along the glide path. The null information thus provided is extremely precise as it is obtained by the beam splitting of very narrow beams.

In addition to the above, the use of high operating frequencies for the different antenna beams makes possible the monitoring of the aircraft's position on the ground by utilizing the reflected radar echo from the aircraft. The ground based transmitters which generate the azimuth and elevation beams thus serve a dual function, i.e., they produce a unique frequency-versus-angular-position space for measurement of position in the aircraft and they produce radar echoes from the aircraft so that ground-based receivers can monitor the position of the aircraft by radar techniques. Consequently, it is seen that the instrument approach and landing system of the present invention provides data of sufficient accuracy for the actual landing of the aircraft and, in addition, provides ground control approach information for the monitoring of the aircraft's position from the ground.

The simplest method of generating the multiplicity of narrow antenna beams, each beam at a different frequency and at a different angular position in space, is to utilize frequency scan radar techniques. These techniques consist of using an antenna whose radiated beam position is a function of the operating frequency of the radar. By changing the frequency of the radar in discrete increments, the antenna radiation pattern can be made to step-scan in one plane. Inasmuch as the change in frequency may be performed electronically, extremely rapid scan rates may be obtained, thus providing practically continuous position data in the aircraft and monitoring data on the ground. The employment of frequency scan radar techniques results in an appreciable improvement in performance compared to conventional monochromatic mechanical scanning radars from the standpoint of data rate, rejection of ground clutter signals, and accuracy of antenna beam positioning. Since frequency scan beam positioning is far less dependent on mechanical tolerances, a scanning system of high angular precision is obtainable which requires a minimum of adjustments and maintenance.

It is therefore an object of the invention to provide apparatus capable of radiating a multiplicity of narrow beams, each of a different frequency, from at least two different locations in the vicinity of a runway thereby to produce a correspondence between frequency and angular coordinates within the approach volume to the runway.

Another object of the device of the present invention is to provide an aircraft with accurate information to enable it to approach and land on a runway along an improved localizer glide path.

Still another object of the device of the present invention is to provide accurate information to an aircraft to enable it to approach and land on a runway along a predetermined glide path formed by the intersection of at least two narrow beams, each of a different frequency and radiated from different locations in the vicinity of the runway.

A further object of the device of the present invention is to provide an aircraft with glide path information to enable it to approach and land on a runway and, simultaneously, to provide ground personnel with a radar presentation to enable them to monitor the landing.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 1 shows a block diagram of the ground installation portion of the system of the present invention;

Figs. 2 and 3 are, respectively, a perspective and plan view showing schematically a typical airport installation of the device of the present invention;

Figs. 5, 5a and 5b show the azimuth frequency shift antenna illustrated schematically in Fig. 1;

Figure 6:
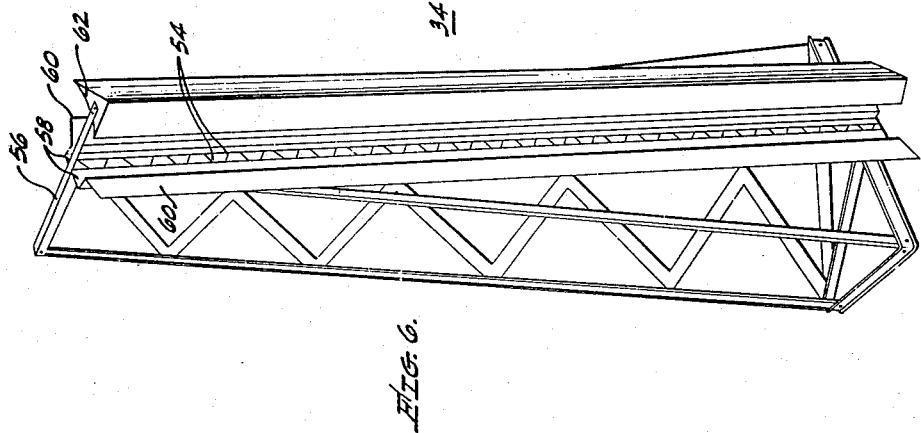
Figure 6A:
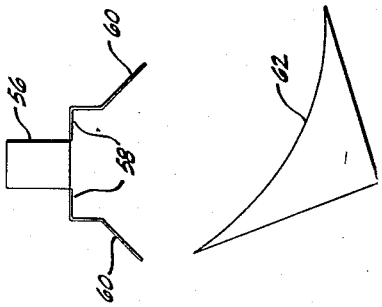
Figure 7:
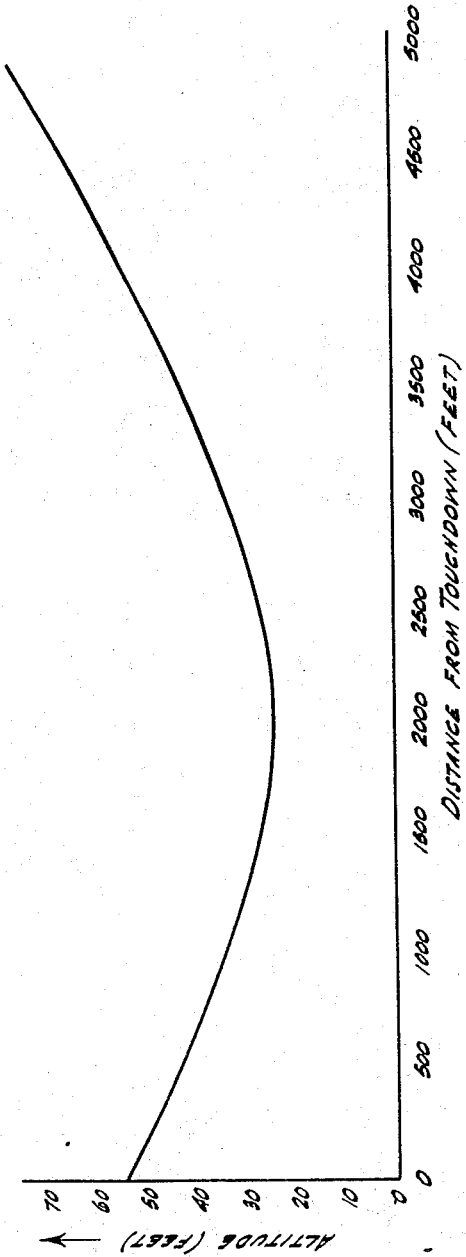
Figure 8:
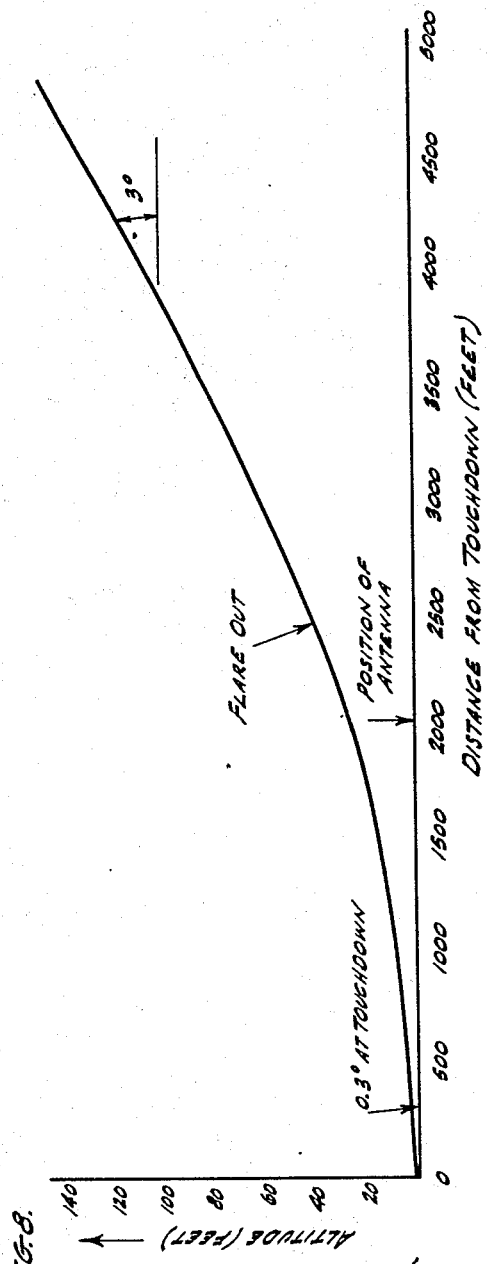

Figs. 6, and 6a show the elevation frequency shift antenna illustrated schematically in Fig. 1;

Figs. 7 and 8 are illustrative curves of the glide path of the device of the present invention;

Figs. 9 and 10 show in partly block form additional details of certain major components of the apparatus shown in Fig. 1; and Fig. 11 is a block diagram of the airborne installation portion of the system of the present invention.

Referring now to Fig. 1, the portion of the system of the present invention installed on the ground comprises azimuth and elevation frequency scan radars 10 and 12, respectively, which operate in conjunction with a master control unit 18 which includes an azimuth-elevation range indicator 19 for monitoring the position of the aircraft. The azimuth frequency scan radar 10 includes an azimuth scan transmitter 20, an azimuth scan receiver 22, and an antenna schematically shown at 24. Similarly, the elevation frequency scan radar 12 includes an elevation scan transmitter 30, an elevation scan receiver 32, and an antenna 34. The azimuth and elevation radars 10, 12 are synchronized by means of transmit triggers provided by the master control unit 18. The azimuth and elevation video necessary for the azimuth-elevation range indicator 19 of the master control unit 18 is, in turn, provided by the azimuth and elevation scan receivers 22, 32, respectively, as indicated by the leads 23, 33.

Referring to Figs. 2 and 3, the azimuth frequency scan radar 10 including its associated antenna 24 may be located approximately 1200 feet beyond the takeoff end of the runway. The antenna 24 radiates a fan beam which is one-half in azimuth and seven degrees in elevation at the half-power points and during operation scans ±10.5 degrees in azimuth. A complete scan is accomplished in a frequency bandwidth of the order of approximately 10 percent.

The elevation frequency scan radar 12 including its associated antenna 34, on the other hand, may be located 1000 feet to one side of the runway and approximately 2000 feet ahead of the area where the aircraft should touch down. These distances are desirable, but it is recognized that not all airports are capable of providing this location conveniently. The above distances are preferred to insure that the touchdown area is outside of the Fresnel zone of the antenna. However, the extent of the Fresnel zone can be shortened by prefocusing the antenna so that the above distances can be considerably reduced. If desirable, the 2000 feet displacement from the touchdown area may be reduced to the extent that the elevation antenna 34 may be placed directly opposite the beginning of the runway.

The elevation antenna 34 radiates a fan-shaped beam one-half degree in elevation and 21 degrees in azimuth and in operation scans from zero degrees to seven degrees in elevation. This scan is accomplished in a frequency bandwidth of approximately ±5 percent. Both the azimuth and elevation frequency scan radars 10 and 12, respectively, have the same pulse repetition rate, frame scan rate and, in addition, scan their respective frames simultaneously. Thus, the scanning rate in degrees per unit time is three times as high for the azimuth radar 10 as for the elevation radar 12. The frequency bands of the two radars are distinct so that the two angular coordinates of any position in the scanned approach volume are uniquely defined in terms of two frequencies.

Figure 4:
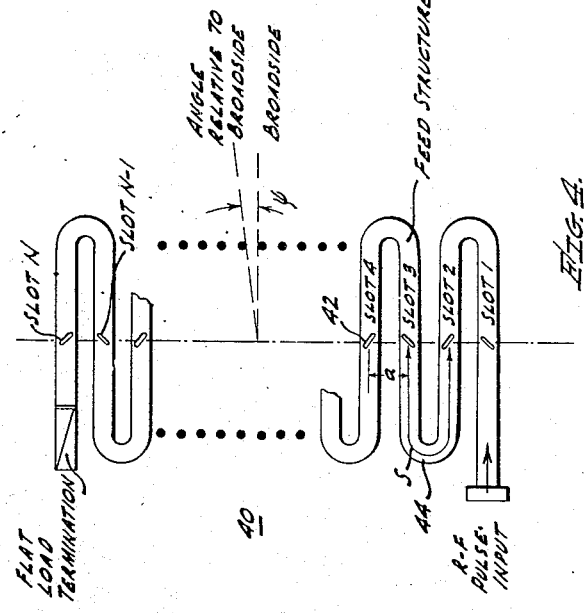
Fig. 4 is a schematic diagram of a frequency shift antenna.

In order to understand more clearly the operation of the azimuth and elevation frequency scan antennas 24 and 34, a review of the characteristics of a frequency scan antenna is herewith presented. Illustrated schematically in Fig. 4 is a basic device 40 by which an antenna beam is caused to scan by change of operating frequency. The device 40 comprises a linear array of slot-radiating elements 42 disposed at periodic intervals along the narrow wall of a rectangular waveguide 44. The linear array of slot-radiating elements 42 is fed by the waveguide 44 which is arranged in such a manner that the length of line between adjacent slots is larger than the inter-element spacing, "$a$" and a progressive shift of $\beta$ radians occurs between adjacent slots. Under these circumstances, the angle $\psi$ of the main beam relative to the broadside of the array is:

$$\psi = \arcsin \frac{\beta \lambda}{2\pi a} \qquad (1)$$

wherein $\lambda$ is the free space wavelength at the instantaneous frequency of operation. If the slot-radiating elements 42 are fed by a waveguide having a length "$s$" between adjacent slots, Equation 1 can be written $$\psi = \arcsin \left[ \frac{s}{a} \left( \frac{\lambda}{\lambda g} - \frac{\lambda}{\lambda go} \right) \right] \qquad (2)$$

wherein $\lambda g$ is the guide wavelength at the frequency of operation under consideration, and $\lambda go$ is the guide wavelength when the beam is broadside, i.e., $\psi = 0$.

As is evident from Equation 2, the beam angle versus frequency sensitivity of the array is proportional to $s/a$. When the ratio $s/a$ is made large compared to unity, the antenna beam can be made to scan over a large angle with a small change in operating frequency; i.e., a large change in $\psi$ is produced for a small change in operating frequency. In addition to the scan frequency bandwidth, several other factors must be considered in an array with a large ratio of $s/a$. Among the more important of these are the electromagnetic wave transit time effects, temperature sensitivity of the beam position and the waveguide attenuation produced by the feed structure. For very short pulses, the time required for the electromagnetic energy to travel the length of the feed waveguide may be comparable to the length of the pulse, resulting in transient excitation of the antenna thereby producing broader beamwidths and higher side lobes than when the antenna is energized in a steady state condition. It has been found, however, that when the transit time is less than 15 to 20 percent of the transmitter pulse length, no appreciable deterioration of the antenna pattern results.

The slot radiators 42 in the array are coupled to the waveguide 44 in a controlled manner, so that the beam shape in the plane of the array possesses the desired narrow beam and side-lobe characteristics. In the plane normal to the array, beam shaping is performed by conventional methods, that is, by means of horns, reflectors, or a combination of the two methods.

An actual embodiment of the azimuth frequency scanning antenna 24 is shown in Figs. 5, 5a and 5b. The antenna 24 comprises a linear array 48 of slots in the broad face of a conventional X-band waveguide section 46. The slots of the array 48 are disposed periodically along and parallel to the longitudinal axis of the waveguide section 46 on alternately opposite sides of the center line of the broad face. The linear array 48 of slots feeds a primary horn 50, which in turn illuminates a parabolic cylinder 52. The parabolic cylinder 52 constitutes a reflector which is of the order of 14 feet in length and 1 foot in height to produce a one-way gain of approximately 38 decibels and resulting in the desired beam width of one-half degree in azimuth and seven degrees in elevation.

The linear array 48 of slots is cut in a straight portion of the waveguide section 46 with a ratio $s/a=1$, see Equation 2, thereby giving a minimum change in the azimuth angle of the beam for corresponding changes in the operating frequency. The minimum value of $s/a$ is preferred to minimize the transit time excitation of the array 48 so as to enable the use of a very short transmitter pulse length. In addition, the unity value of $s/a$ has other advantages in that the waveguide losses can be kept to about one-half decibel and the temperature sensitivity of the waveguide reduced to where a temperature excursion of 120° centigrade results in a beam shift of only $\pm 0.04$ degree in azimuth. The wave polarization of the antenna 24 is vertical. During operation, a frequency band of approximately 20 percent centered at 8500 megacycles per second is required to scan the beam over a 20° angle. The azimuth antenna 24 radiates a vertical fan-shaped beam which step-scans the runway in azimuth, each step being equal to the azimuth beam width, i.e., one-half degree. The antenna 24 is disposed so that the crossover point between two of its centermost beams defines a localizer path 64 which is a vertical plane passing through the center of the runway as indicated in Fig. 3. Accordingly, the beam radiated by the azimuth antenna 24 is designated as the "localizer beam."

An actual embodiment of the elevation frequency scanning antenna 34 is shown in Figs. 6 and 6a. The antenna comprises a linear array 54 of periodically spaced edge slots in the narrow face of a conventional X-band rectangular waveguide section 56. The array 54 feeds a simple horn 58 to which deflecting vanes 60 are attached. The horn 58 together with the deflecting vanes 60 illuminate a reflector 62 to produce a wide angle cosecant beam. It is to be noted that this particular antenna configuration is only one of several ways of producing the required radiation pattern. Further, elevation antenna 34 may be "prefocused" by imposing a slight curvature to the array 54 in a plane normal to the direction of the runway, i.e., the array 54 together with its associated horns and reflectors is made concave towards the runway, thereby reducing the extent of the near zone of the radiation pattern. This prefocusing of the array 54 may permit the lateral displacement of the elevation antenna 34 from the runway to be substantially reduced.

The linear array 54 shown in Fig. 6 is approximately 12 feet in height and the reflector 62 five inches in width and tilted toward the take-off end of the runway by an angle of the order of 1.5°. With the aforementioned dimensions, the antenna 34 has a one-way gain of approximately 31.5 decibels, radiates a beam that has a beam width of one-half degree in elevation and 21 degrees in azimuth, and has an azimuth pattern shaped to cover the runway and approach volume of the airport as indicated by its beam pattern 63 in Fig. 3. The frequency sensitivity of the elevation antenna 34 is similar to that of the azimuth antenna 24 but the frequency scanning bandwidth employed is only 10 percent and is centered at 10,000 megacycles per second. Similar to the electromagnetic energy radiated from the array 48 of the azimuth antenna, the radiated energy from the linear array 54 of edge slots is also vertically polarized. Further, when a conventional X-band rectangular waveguide is employed for the feeds for both the azimuth antenna 24 and the vertical antenna 34, the temperature sensitivity of the antenna 34 is less than that of the azimuth antenna 24, due to the fact that the elevation antenna 34 operates at a slightly higher frequency.

The elevation antenna 34 of the elevation scan radar 12 is preferably located 1000 feet to one side of the runway and approximately 2000 feet ahead of the touchdown area. These dimensions may be reduced to satisfy airport space limitations by prefocusing the elevation antenna 34 as previously described. In operation, the elevation antenna 34 radiates a horizontal fan-shaped beam which step-scans in elevation, each step being one-half the elevation beam width, i.e., one-quarter degree.

By way of explanation of the manner in which the glide path is produced consider first the radiation pattern of a linear array of isotropic radiators and let the array be long in terms of wavelengths. The radiation patterns produced by such an array are figures of revolution and are narrow in any plane containing the array. At broadside the radiation pattern or beam of such an array is shaped in the form of a disc. As the radiated beam of the array is scanned from broadside, the disc becomes the surface of a circular cone. The radiation pattern 63 (Fig. 3) of the elevation antenna 34 has the same characteristics as if it were a part of the radiation pattern of a linear array of isotropic radiators. Thus, if the elevation antenna 34 was placed in the center of the runway, the intersection between its radiation pattern 63, since it is a portion of a conical surface, and the localizer plane 64 would prescribe a glide path which would be a straight line. By placing the antenna 34 to one side of the runway, however, the intersection between its radiated beam and the localizer plane 64 becomes a hyperbola, as is shown in Fig. 7. For reasonable displacement of the antenna 34 from the runway this hyperbola is too sharp to allow touchdown at its vertex because flare-out (the region where the aircraft commences to assume a landing slope) would occur too close to the ground. In the system of the present invention, however, the elevation antenna 34 is tilted toward the take-off direction of the runway, thereby producing a very satisfactory glide path and flare-out, as shown in Fig. 8.

By tilting the elevation antenna 34 in this manner, a hyperbolic glide path is produced at the intersection with the localizer beam where one asymptote of the hyperbola constitutes the glide slope, the knee of the hyperbola constitutes the flare-out, and the second asymptote becomes the landing slope. The actual amount of antenna tilt required is small, for example, the tilt of approximately 1.5° employed in the present case produces a glide slope of 3°, a flare-out at approximately 40 feet from the ground, and a landing slope of 0.3° at touchdown. For an aircraft having a landing speed of 240 knots following this glide path, the maximum vertical component of acceleration which would be experienced at flare-out is approximately 0.13 times the acceleration due to gravity. This is not large enough to cause any substantial deviation from the glide path during flare-out. A landing slope of 0.3° corresponds to a vertical component of velocity ranging from ½ to 2 feet per second, for 60 to 240 knots landing speed, respectively. Referring to Fig. 3, the horizontal distance from flare-out to touchdown may be approximately 3000 feet. A decrease in the distance between the elevation antenna 34 and the runway will result in a modified but still usable landing glide path. In general, such a landing glide path will necessitate slightly higher vertical velocities, such as ¾ to 3 feet per second, and higher accelerations at touchdown and flare-out respectively.

Referring again to Fig. 1, the power for generating the azimuth and elevation radiation patterns is provided by the azimuth and elevation scan transmitters 20 and 30, respectively. These two transmitters are similar with the exception of their operating frequencies and bandwidth. By way of example, each transmitter may have a peak pulse power output of 50 kilowatts, a pulse width of 0.3 microsecond and a pulse repetition frequency of 6,500 pulses per second. Each of the transmitters 20 and 30 comprises two sub-units; namely, microwave amplifiers 74, 76, and exciters 78, 80, respectively. The generation of the precise low level transmitter and receiver local oscillator signal frequencies is performed by the exciters 78, 80 in response to the transmit trigger signal from the master control unit 18. The low level transmitter signals from each of the exciters 78, 80 drives the microwave amplifiers 74, 76, respectively, the power output of each amplifier is the desired 50 kilowatts. The receiver local oscillator signals from the exciters 78, 80 are made available to the azimuth and elevation scan receivers 22, 32, respectively. In addition, the azimuth and elevation receivers 22, 32 are coupled through duplexers to the azimuth and elevation antennas 24, 34, respectively. Hence, in order that the receivers 22, 32 be desensitized during intervals when microwave energy provided by the transmitters 20, 30 is being radiated by the antennas 24, 34, respectively, the receivers 22, 32 have impressed thereon the respective transmit trigger signals provided by the master control unit 18. Also the receivers 22, 32 provide the azimuth and elevation video necessary for the azimuth-elevation indicator 19 by means of the connections therefrom over the leads 23, 33 to the master control unit 18.

The exciters 78, 80 constitute the sources of the frequencies which determine the beam positions of the energy radiated from the azimuth and elevation frequency scan antennas 24, 34, respectively. The output frequencies of the transmitter signals from the exciters 78, 80 are preferably stable and have precise values, so that a standardized receiving apparatus on the aircraft may be made highly selective during the final stages of the landing operation. It is to be noted that the position of the pair of beams generated by the azimuth radar 10 which define the localizer plane 64 and the position of the pair of beams generated by the elevation radar 12, the intersection of which with the localizer plane 64 determines the landing path of the aircraft, are automatically determined by the characteristics and attitude of the azimuth and elevation antennas 24, 34, respectively. Secondly, the exciters 78, 80 provide local oscillator signals for the duration of the listening period between transmitted pulses for the azimuth and elevation receivers 22, 32, respectively, which differ frequency-wise from the signal to the microwave amplifiers 74, 76 by the 30 megacycles per second intermediate frequency of the receivers.

One example of an embodiment of exciter 80 that may be employed in the elevation frequency scanning radar 12 is described in order to illustrate one manner in which the above requirements may be fulfilled. A typical frequency band necessary to scan the seven-degree elevation sector covered by the elevation antenna 34 is from 9,500 to 10,470 megacycles per second. If the elevation beam, for example, is made to step-scan in one-quarter degree increments throughout the above sector, it is necessary that 28 discrete frequencies in the above frequency band be generated.

A block diagram of exciter 80 employed in the transmitter 30 of the elevation frequency scanning radar 12 is shown in Fig. 9. As is generally known, the frequency of oscillation of a backward-wave oscillator may be electronically tuned over an extremely broad band of frequencies, and for a given oscillator, is determined by the potential existing between the helical slow-wave structure and the cathode of its associated electron gun.

Referring to Fig. 9, the exciter 80 comprises a transmitter backward-wave oscillator 81 for generating the transmitter signal and a receiver backward-wave oscillator 82 for generating the receiver local oscillator signal which operate in conjunction with a low-voltage power supply 83, a stable power supply 84 and a step-voltage generator 85. The transmitter and receiver backward-wave oscillator 81 and 82, respectively, may be of the type described in a copending application for patent, Serial No. 371,796, now abandoned, entitled Backward-Wave Oscillator filed by Dean A. Watkins on August 3, 1953, which incorporates a helical slow-wave structure. A backward-wave oscillator of this type has a frequency versus helix voltage sensitivity of the order of 1 megacycle per second per volt. In order to give a beam position accuracy of ±0.05 degree for the elevation scan radar, the frequency must be held within ±5 megacycles per second. This frequency tolerance requires the power supply to be stable within ±5 volts, which is not difficult to realize.

The step-voltage generator 85 produces two voltages which remain constant during the intervals between trigger signals produced by an early trigger generator 86 and which assume 28 predetermined magnitudes in a succession determined by the sequence in which it is desired to radiate the signals of 28 discrete frequencies. The early trigger generator 86 accepts the transmit trigger from the master control unit 18 and essentially performs a time delay to produce an "early" trigger in the sense that it precedes, in time, the succeeding transmitter trigger. This early trigger is generated at the end of the receiving period which follows each transmitted pulse.

The two series of voltages produced by the step-voltage generator 85 are impressed on the transmitter and receiver backward-wave oscillators 81, 82 in a maner to produce the desired frequencies of oscillation. During operation, the early trigger effects a change in the magnitude of the voltages produced by the step-voltage generator 85 prior to the instant each pulse is transmited by a period that is adequate to allow the system to recover from any transients incident to the change in frequency. Also, an automatic frequency control device 88 which is responsive to both the transmitter signal generated by the oscillator 81 and the receiver local oscillator signal generated by the oscillator 82 is connected to the step-voltage generator 85 and functions in a manner to change the magnitude of the voltage impressed on the received backward-wave oscillator 82 so that the frequency of the local oscillator signal differs from that of the transmitter signal by the intermediate frequency of the elevation receiver 32.

The output signal from the transmitter backward-wave oscillator 81, is fed to a traveling-wave tube amplifier 90. The traveling-wave tube 90 is modulated by a narrow pulse 92 from the modulator in the microwave amplifier 76 so as to generate the drive signal of approximately 1 watt peak power required by the microwave amplifier 76.

The exciter 78 employed in the azimuth transmitter 20 of the azimuth frequency scanning radar 10 may be similar to the exciter 80 of the elevation frequency scanning radar 12 described above, except that an additional number of transmitter and receiver signals is required to cover the larger angle of scan. A typical frequency band may, for example, range from 7,620 to 9,360 megacycles per second. It is evident that the additional frequencies may be generated by increasing the number of voltage steps generated by the step-voltage generator incorporated in the azimuth exciter 78.

The microwave amplifiers 74, 76 for the azimuth and elevation transmitters 20, 30, respectively, are similar except for their operating frequencies and bandwidths. Each amplifier has, for example, a 47 decibel gain, an output peak pulse power of 50 kilowatts and a pulse length of 0.3 microsecond. A schematic block diagram of the microwave amplifier 74 of the azimuth radar 10 is shown by way of example in Fig. 10. Referring to this figure, the microwave amplifier 74 includes a traveling-wave tube buffer amplifier 96 which is driven by the one watt transmitter signal from the azimuth exciter 78. The buffer traveling-wave tube 96 has a gain of approximately 30 decibels and is similar to the traveling-wave tube amplifier employed in the exciter 78. During operation, the cathodes of both traveling-wave tubes are pulsed with the pulse 92 by means of a common modulator 98. The pulse 92 constitutes a 10 kilovolt negative pulse of 0.4 microsecond duration with rise and fall times of 0.3 microsecond, the rise of each pulse 92 being initiated by the transmit trigger from the master control unit 18.

A high power traveling-wave tube 100 capable of approximately 17 decibel gain provides the final amplifier stage. A tube of this type is disclosed in a copending application for patent, Serial No. 450,987, entitled High Power Microwave Tube, filed August 19, 1954 by Charles K. Birdsall. In the case of the traveling-wave tube 100, however, the transmit trigger from the master control unit 18 is first delayed by 0.35 microsecond by means of a delay line 102. The delayed transmit trigger pulse is then employed to trigger the output modulator 104 which, in turn, energizes a 1:3 pulse transformer 106 to produce a −30 kilovolt, 0.3 microsecond pulse 108. This 30 kilovolt pulse 108 is impressed on the cathode of the traveling-wave tube 100 during an interval that is coextensive with the duration of the pulsed transmitter signal from the buffer traveling-wave amplifier tube 96. The pulsed transmitter output signal from the tube 96 has an envelope as indicated in Fig. 10 that corresponds to the shape of the pulse 92 generated by the modulator 98, that is, a duration of 0.4 microsecond and a rise and fall time of 0.3 microsecond. Inasmuch as the 30 kilovolt pulse 108 has been delayed 0.35 microsecond, from the beginning of the rise of the pulse 92, the traveling-wave tube 100 amplification commencing 0.05 microsecond after the start of and ending 0.05 microsecond prior to the termination of the flat top or maximum value 0.4 microsecond portion of the pulse 92. From the above, it is apparent that the traveling-wave tube 100 has full microwave frequency excitation during the entire duration of the 0.3 microsecond, 30 kilovolt pulse 108. Thus, the output signal from the traveling-wave tube 100 illustrated in Fig. 10 and which is employed to energize the azimuth antenna 24, has a 0.3 microsecond duration, is of the same frequency as that generated in the exciter 78 and has a peak power of approximately 50 kilowatts.

The function of the airborne portion of the instrument approach and landing system of the present invention is to measure the frequency of the transmitted signals of the azimuth and elevation frequency scan radars 10 and 12, which are incident on the aircraft. These measurements give the two basic angular coordinates of the aircraft with respect to the runway, i.e., the azimuth and elevation angles. A block diagram of the portion of the apparatus installed on the aircraft is shown in Fig. 11. Referring to this figure, the airborne apparatus comprises an elevation channel 120 and an azimuth channel 122, which operate in conjunction with a common antenna 124 and a common glide and localizer path indicator 126.

The antenna 124 is a single flush-mounted slot antenna capable of receiving the two ground transmitter signals. Since the antenna is mounted a known distance above the wheels of the aircraft the angular position measurements can be given in terms of the positions of the landing wheels above the runway. The elevation and azimuth channels 120, 122 are similar, except for the different frequency coverage.

The elevation channel comprises an elevation scan filter 128, the output of which is impressed upon both a coarse-discriminator 132 and a fine discriminator 134. A switch 136 enables the output from one of the discriminators 132, 134 to be selected and impressed upon a detector amplifier 138. The azimuth channel 122 is similar to the elevation channel 120, comprising an azimuth scan filter 130 the output of which is impressed upon both a coarse-discriminator 140 and a fine discriminator 142. A switch 144 enables the output of one of the discriminators 140, 142 to be impressed upon a detector amplifier 146.

The elevation and azimuth scan filters 128, 130 are of the band-pass type which are tuned to the frequency range employed by the corresponding radar system installed on the ground. The discriminators 132, 134 and 140, 142 provide video output voltages whose magnitude is a function of the frequency of the input signal. The coarse discriminators 132, 140 may, for example, cover the entire frequency band of the corresponding ground based radar system whereas the fine discriminators may have a frequency range, for example, of only 1 percent. The coarse and fine discriminators 132, 134 are, of course, centered so as to produce a null signal at a frequency midway between the frequencies of the two elevation beams selected to produce the glide path. The coarse and fine discriminators 140, 142, on the other hand, are centered to produce a null signal at a frequency midway between the two azimuth beams selected to provide the localizer path. The output voltages from the discriminators together with the derivatives thereof, if desired, are used to provide the steering information for the glide and localizer path indicator 126. The coarse discriminators 132, 140 are used in the initial approach phase where deviations of the aircraft from the landing course may be large. Automatic or manual means may be employed to throw the switches 136, 144 to the outputs of the fine discriminators 134, 142 when the deviations from the landing course become small, thus providing more accurate steering information for the pilot.

The detector amplifiers 138, 146 of the elevation and azimuth channels 120, 122 convert video pulses received from the discriminators into corresponding direct-current voltages. The voltages thus generated by the detector-amplifiers 138, 146 are proportional to the deviation of the frequency of the received signal from the null frequency of its associated discriminator and thus are indicative of the deviation of the aircraft from the desired landing course. The voltages developed by both the elevation and azimuth channels 120, 122 which are indicative of the deviation from the desired landing course are presented in visual form to the pilot of the aircraft by means of the glide and localizer path indicator 126.

What is claimed is:

1. An instrument approach and landing system for aircraft comprising means disposed beyond one extremity of a runway across an extension of the longitudinal axis thereof for radiating a first plurality of thin vertical beams throughout a selected approach volume to the runway, the frequency of each of said vertical beams being within a first band of frequencies and being unique with respect to the azimuth thereof, whereby a first predetermined frequency within said first band defines a localizer plane which contains said longitudinal axis and is perpendicular to the surface of the runway; means including a vertical linear array of radiating elements disposed in the vicinity of the opposite extremity of the runway, tilted at a predetermined angle towards said one extremity and spaced from the longitudinal axis thereof for radiating a second plurality of thin tilted conically-shaped beams throughout said approach volume, the frequency of each of said conically-shaped beams being within a second band of frequencies and being unique with respect to its angle of elevation, whereby the intersection between at least one conically-shaped beam and said localizer plane defines a hyperbolic path whereby one asymptotic portion of said hyperbolic path provides a glide slope of an angle to the runway for the aircraft that is substantially equal to twice said predetermined angle, whereby the knee portion of said hyperbolic path provides a flare-out region for said aircraft, and whereby the remaining asymptotic portion of said hyperbolic path provides a landing slope to the runway for the aircraft, said landing slope being substantially equal to one-fifth said predetermined angle thereby enabling an aircraft possessing means for receiving said first and second predetermined frequencies to be directed along said path.

2. An instrument approach and landing system for aircraft comprising means disposed beyond one extremity of a runway across an extension of the longitudinal axis thereof for radiating a first plurality of thin vertical beams throughout a selected approach volume to the runway, the frequency of each of said vertical beams being within a first band of frequencies and being unique with respect to the azimuth thereof, whereby a first predetermined frequency within said first band defines a localizer plane which contains said longitudinal axis and is perpendicular to the surface of the runway; means including a vertical linear array of radiating elements disposed in the vicinity of the opposite extremity of the runway, spaced from the longitudinal axis thereof and curved inwards toward and in a plane normal to said runway and spaced from the longitudinal thereof for radiating a second plurality of thin prefocused conically-shaped beams throughout said approach volume, the frequency of each of said conically-shaped beams being within a second band of frequencies and being unique with respect to its angle of elevation whereby the intersection between the cross-over of two selected adjacent conically-shaped beams corresponding to a second predetermined frequency within said second band, and said localizer plane defines a hyperbolic path thereby to enable an aircraft possessing means for producing null indications at said first and second predetermined frequencies to be directed along said path.

3. The instrument approach and landing system for aircraft as defined in claim 1 wherein said predetermined angle is substantially equal to 1.5°.

4. An instrument approach and landing system for aircraft comprising an azimuth frequency-scanning antenna disposed beyond one extremity of a runway across an extension of the longitudinal axis thereof, the radiation pattern of said azimuth antenna being a thin vertical beam having an azimuth direction dependent upon the frequency of the microwave energy with which said azimuth antenna is energized; means for periodically energizing said azimuth antenna with pulsed microwave signals of successively different frequencies within a first frequency band to step-scan said narrow vertical beam across a selected approach volume to the runway, whereby a first predetermined frequency within said first band defines a localizer plane which contains said longitudinal axis and is normal to the surface of said runway; an elevation frequency-scanning antenna disposed in the vicinity of the opposite extremity of the runway and spaced from the longitudinal axis thereof, the portion of the radiation pattern of said elevation antenna within said approach volume being a tilted flat conically-shaped beam with a vertex coinciding with the position of said elevation antenna, and the angle of elevation of said conically-shaped beam being dependent upon the frequency of the microwave energy with which said elevation antenna is energized; means for periodically energizing said elevation antenna with pulsed microwave signals of successively different frequencies within a second frequency band to step-scan said tilted conically-shaped beam in elevation, whereby the intersection between the cross-over of two selected adjacent flat beams, corresponding to a second predetermined frequency within said second band, and said localizer plane defines a tilted hyperbolic descent path; and means disposed on board an aircraft and tuned to said first and second predetermined frequencies for producing signals to enable the aircraft to be directed along said descent path.

5. The instrument approach and landing system for aircraft as defined in claim 4 which additionally includes means coupled to said azimuth antenna for receiving echo signals in response to the vertical beams radiated therefrom and reflected from the aircraft, means coupled to said elevation antenna for receiving echo signals in response to the flat conically-shaped beams radiated therefrom and reflected from the aircraft, and means responsive to said echo signals for providing a visual presentation of the position of the aircraft with respect to the runway.

6. The instrument approach and landing system for aircraft as defined in claim 4 wherein said azimuth frequency-scanning antenna includes a straight section of rectangular waveguide disposed in a horizontal position wherein one of the broadsides of said waveguide defines a series of periodically spaced slots, thereby to provide a linear array of radiating elements, said slots being disposed parallel to the longitudinal axis of said waveguide and on alternately opposite sides of the center line of said one broad side.

7. The instrument approach and landing system for aircraft as defined in claim 4 wherein said elevation frequency-scanning antenna includes a rectangular waveguide section mounted in a substantially vertical position wherein one of the narrow sides of said waveguide section defines a series of periodically spaced slots, thereby to provide a linear array of radiating elements.

8. In an instrument approach and landing system for aircraft having apparatus disposed beyond one extremity of a runway along an extension of the longitudinal axis thereof for radiating a first plurality of thin vertical beams throughout a selected approach volume to the runway, the frequency of each of said vertical beams being within a first band of frequencies and unique with respect to the azimuth thereof, and apparatus disposed beyond the opposite extremity of the runway and spaced from the longitudinal axis thereof for radiating a second plurality of thin flat beams throughout said approach volume, the frequency of each of said flat beams being within a second band of frequencies and unique with respect to its angle of elevation, a system disposed on board said aircraft for determining its angular position with respect to said runway comprising: an antenna disposed on said aircraft at a predetermined distance above the landing gear thereof for receiving electromagnetic energy incident on said aircraft, first and second band-pass filters coupled to said antenna having pass-bands coextensive with said first and second bands of frequencies, respectively, and apparatus coupled to said first and second filters for producing first and second analogue quantities representative, respectively, of the difference in the frequency of said received electromagnetic energy within said first and second bands of frequencies from first and second preselected frequencies within said first and second bands, respectively.

References Cited in the file of this patent

UNITED STATES PATENTS

| | | |
|---|---|---|
| 1,802,688 | Wallace | Apr. 28, 1931 |
| 1,865,826 | Brockstedt | July 5, 1932 |
| 2,205,560 | Herzog | June 25, 1940 |
| 2,294,882 | Alford | Sept. 8, 1942 |
| 2,365,949 | Green | Dec. 26, 1944 |
| 2,378,242 | O'Neil | June 12, 1945 |
| 2,654,084 | Wilkie | Sept. 29, 1953 |

UNITED STATES PATENT OFFICE
CERTIFICATE OF CORRECTION

Patent No. 2,952,845 September 13, 1960

Nicholas A. Begovich et al.

It is hereby certified that error appears in the printed specification of the above numbered patent requiring correction and that the said Letters Patent should read as corrected below.

Column 4, line 7, after "one-half" insert -- degree --; column 8, line 51, for "transmitter" read -- transmit --; line 56, for "maner" read -- manner --; line 68, for "received" read -- receiver --.

Signed and sealed this 11th day of April 1961.

(SEAL)

Attest:

ERNEST W. SWIDER
Attesting Officer

ARTHUR W. CROCKER
Acting Commissioner of Patents